(12) United States Patent
Strehle

(10) Patent No.: US 12,121,979 B2
(45) Date of Patent: Oct. 22, 2024

(54) DRILL HEAD AND METHOD FOR CHAMBERING BLIND DRILL-HOLES

(71) Applicant: botek Präzisionsbohrtechnik GmbH, Riederich (DE)

(72) Inventor: Gerhard Strehle, Wangen (DE)

(73) Assignee: botek Präzisionsbohrtechnik GmbH, Riederich (DE)

( * ) Notice: Subject to any disclaimer, the term of this patent is extended or adjusted under 35 U.S.C. 154(b) by 635 days.

(21) Appl. No.: 17/423,235

(22) PCT Filed: Jan. 15, 2020

(86) PCT No.: PCT/EP2020/050888
§ 371 (c)(1),
(2) Date: Jul. 15, 2021

(87) PCT Pub. No.: WO2020/148323
PCT Pub. Date: Jul. 23, 2020

(65) Prior Publication Data
US 2022/0105575 A1    Apr. 7, 2022

(30) Foreign Application Priority Data

Jan. 15, 2019 (DE) .................. 10 2019 100 890.5

(51) Int. Cl.
  B23B 29/034     (2006.01)
  B23B 41/02      (2006.01)
  B23B 51/00      (2006.01)

(52) U.S. Cl.
  CPC ........ B23B 29/03446 (2013.01); B23B 41/02 (2013.01); B23B 51/0045 (2013.01)

(58) Field of Classification Search
  CPC ........ B23B 29/03446; B23B 29/03417; B23B 41/04; B23B 41/02; B23B 51/0045; B23B 29/034
  See application file for complete search history.

(56) References Cited

U.S. PATENT DOCUMENTS

| 1,637,611 | A | * | 8/1927 | Hiscock | ............ B23B 29/03446 408/168 |
| 4,047,829 | A | * | 9/1977 | Benjamin | ............ B23D 77/042 408/169 |
| 5,222,846 | A | * | 6/1993 | Romi | ................ B23B 29/03446 408/161 |

FOREIGN PATENT DOCUMENTS

| DE | 3245195 A1 | 6/1984 |
| DE | 19605069 A1 | 8/1997 |
| DE | 102009044174 A1 | 4/2011 |
| EP | 0231852 A2 | 8/1987 |
| EP | 0382474 A2 | 8/1990 |
| EP | 0593222 A1 | 4/1994 |
| FR | 2545395 A3 | 11/1984 |

OTHER PUBLICATIONS

International Search Report Form PCT/ISA/210, and Written Opinion Form PCT/ISA/237, International Application No. PCT/EP2020/050888, pp. 1-15 International Filing Date Jan. 15, 2020 mailing date of search report Aug. 17, 2020.
German Office Action, dated Jul. 5, 2023, pp. 1-8.

* cited by examiner

*Primary Examiner* — Alan Snyder
(74) *Attorney, Agent, or Firm* — BOND, SCHOENECK & KING, PLLC; George R. McGuire

(57) ABSTRACT

The invention relates to a drill head for chambering a blind hole with a flat base, and a method directed thereto.

14 Claims, 15 Drawing Sheets

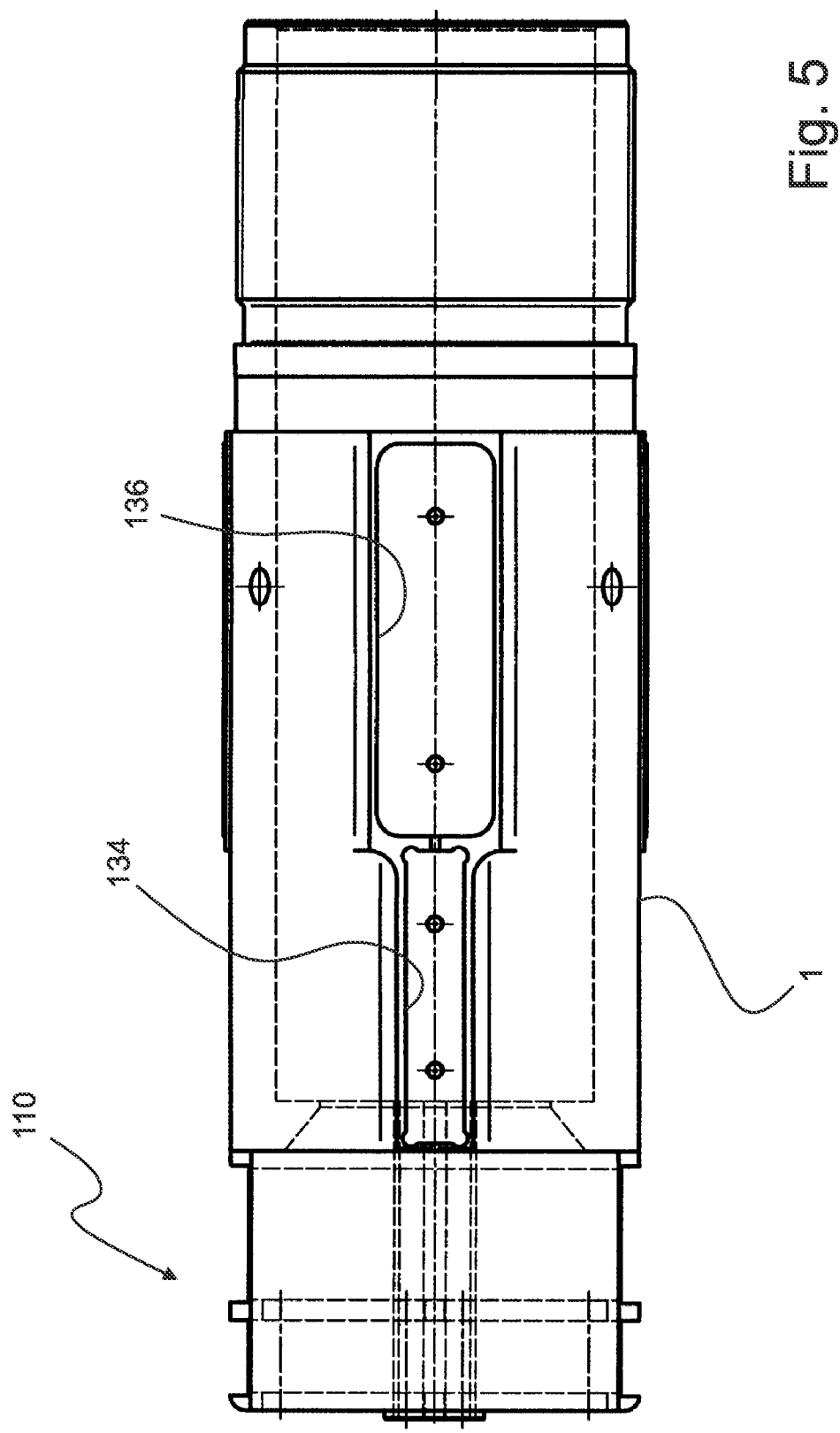

Fig. 8
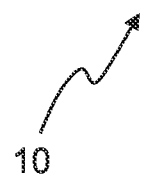
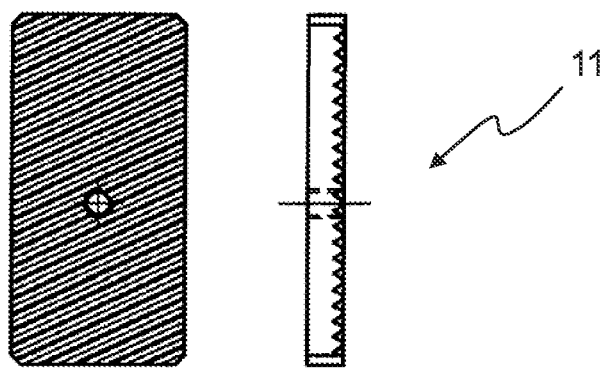
Fig. 10
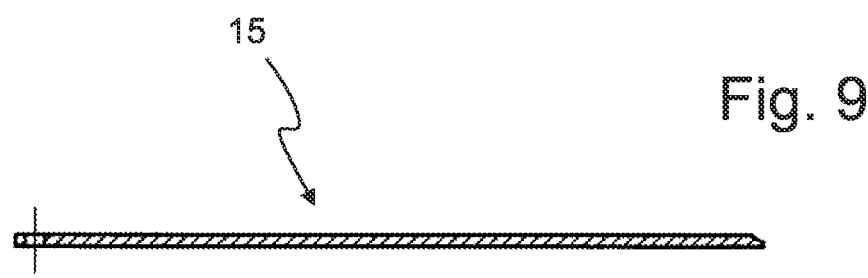
Fig. 9
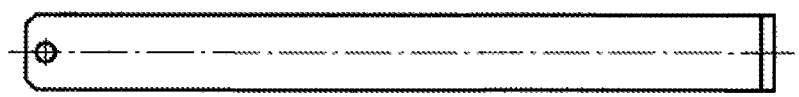

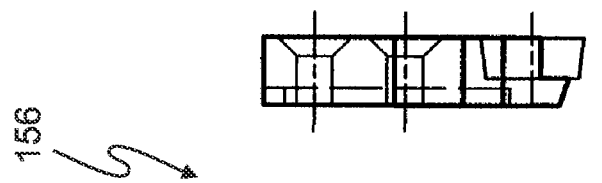
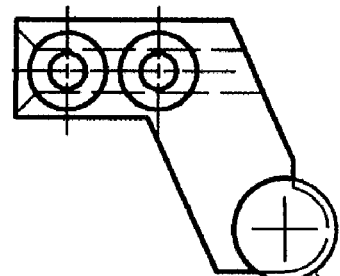
Fig. 15
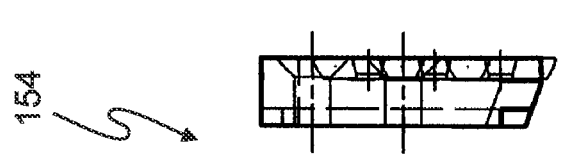
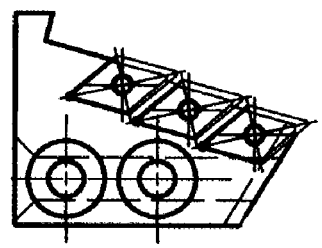
Fig. 14
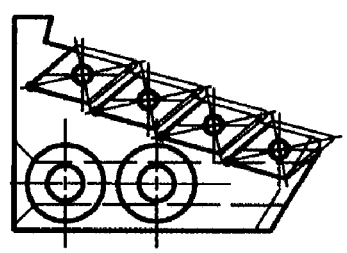
Fig. 13

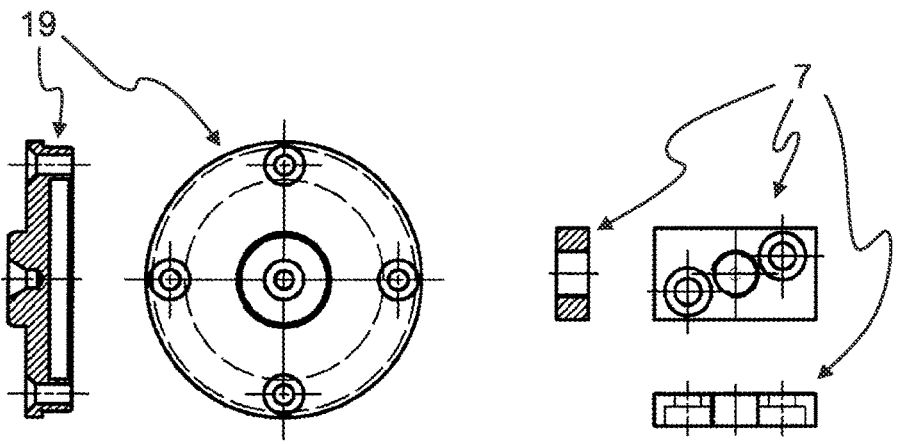
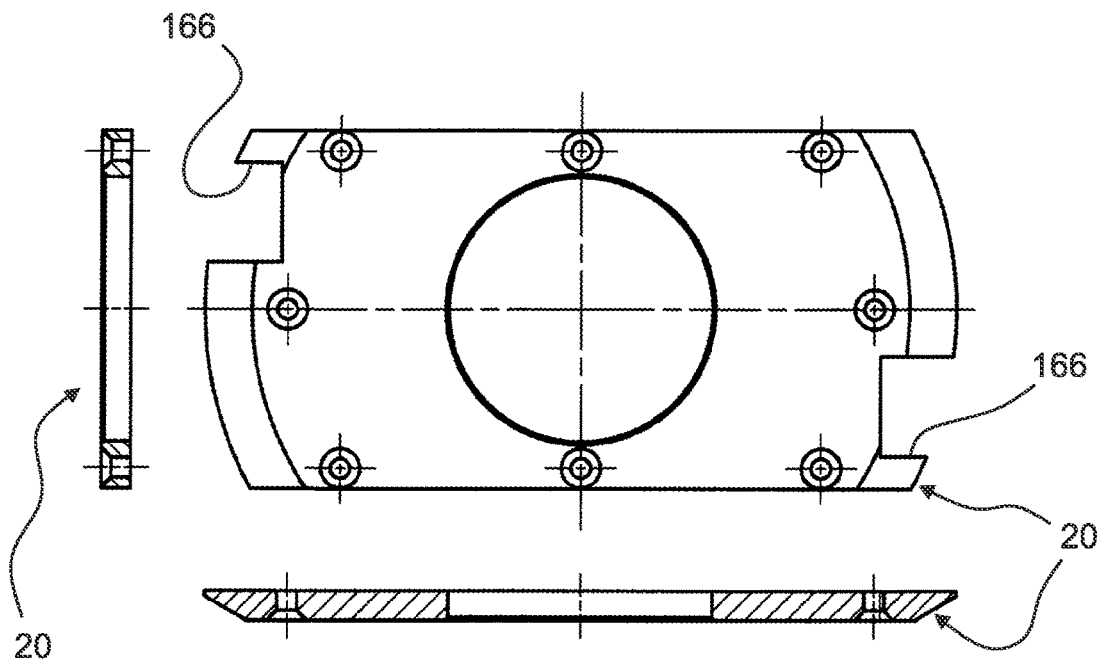
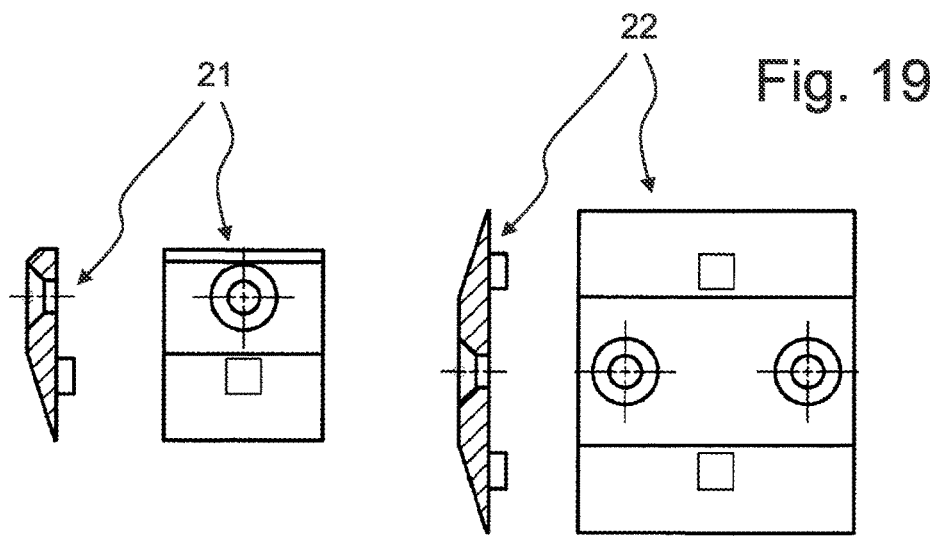
Fig. 19

DRILL HEAD AND METHOD FOR CHAMBERING BLIND DRILL-HOLES

CROSS-REFERENCE TO RELATED APPLICATIONS

This is a National Stage Application filed under 35 U.S.C. 371 based on International Patent Application No. PCT/EP2020/050888, filed on Jan. 15, 2020, which claims priority to German Patent Application No. 10 2019 100 890.5 filed on Jan. 15, 2019, the disclosures of both of which are incorporated herein by reference in their entireties.

BACKGROUND

The invention relates to a drill head for chambering non-cylindrical inner contours and to a method for producing blind holes using a drill head with at least one cranked insert holder.

Drill heads for chambering or internal turning devices are often used to produce a non-cylindrical, rotationally symmetrical inner contour in the interior of components.

A typical application of such drill heads is the chambering of the forged leg of an aircraft landing gear. Such a landing gear leg generally has a frustoconical outer contour in accordance with the bending moments that occur. In order to make the best possible use of the material and to minimize the weight of the landing gear leg, in many cases the landing gear leg is hollow and also has a frustoconical, i.e. non-cylindrical, inner contour.

To produce such inner contours, internal turning devices or drill heads are used which, starting from a cylindrical guide hole, generate the desired non-cylindrical inner contour. DE 196 05 069 A1 discloses such a drill head, which is referred to therein as an internal turning device. Reference is made to DE 196 05 069 A1 for a basic explanation of the structure and mode of operation of a drill head.

It is clear from FIG. 1 of DE 196 05 069 A1 that the workpiece has a continuous guide hole. The drill head is guided by means of guide pads in a portion of this guide hole. The drill head enlarges another portion of the guide hole so that a chamber with the desired inner contour is created.

When looking at the tool shown in longitudinal section in FIG. 2 of the aforementioned laid-open application, it becomes clear that the cutting edge of this drill head cannot reach the front part of the guide hole, so that part of the guide hole always remains "standing," meaning that considerable potential for optimizing the weight of components cannot be tapped with this drill head.
This is due to the fact that the central slider has to carry out a large stroke because of the transmission ratio of the helical teeth between the central slider and the cutting slider and is therefore very long. As a result, the cap for the central slider protrudes far beyond the cutting slider in the axial direction.

In connection with the invention, a blind hole is referred to as a hole or a chambered inner contour of which the end or bottom has been machined, at least in part, by the drill head. The end of the blind hole can have a flat, circular surface.

The object of the invention is to provide a drill head or an internal turning device which allows blind holes to be chambered. In particular, it ought to be possible to use the tool according to the invention to produce a blind hole with a flat base. A further object of the invention is to provide a method for producing such a blind hole.

SUMMARY OF THE INVENTION

According to the invention, with a drill head comprising a body with a rear end and a front end, the body having, at the rear end, a mechanical interface for connection to a drill tube or a deep hole drilling machine and, at the front end, a projection extending in the axial direction, with a central slider which can be displaced in the axial direction being guided in the projection, with at least one third recess extending in the radial direction being formed in the projection, with a cutting slider being guided in every third recess, the central slider and the at least one cutting slider being coupled to one another in such a way that a relative movement between the central slider and the body causes a radial advancing movement of the cutting slider or sliders, this object is achieved in that at least one second recess extending in the radial direction and in parallel with the at least one third recess is formed in the projection, in that a drag slider is guided in the second recess or recesses in each case, and in that in each case a cutting slider and a drag slider are coupled to one another in such a way that advancing movements of the drag slider are transmitted to the cutting slider coupled thereto.

The aim is to achieve a separated design in which the drag slider is located behind the cutting slider as seen from the front end of the drill head. The design according to the invention improves the guidance of the cutting slider in the projection. In addition, the cutting slider or sliders move closer to the end of the drill head in the axial direction. As a result, blind holes can also be machined down to the bottom of the blind hole.

The drag slider is preferably connected to the central slider via helical teeth and converts the relative movement transmitted from the control rod to the central slider into a radial advancing movement. By means of a mechanical coupling, for example by means of pins, of the drag slider(s) and cutting slider(s), this advancing movement is transmitted directly to the cutting slider or sliders, which then transmit it to the straight or cranked insert holder or holders and ultimately the inserts. This design has two main advantages:

The offset in the longitudinal direction required by the cranked insert holder is reduced. This increases the rigidity of the insert holder and it is possible to work with higher cutting capacities.

Due to the double guidance, namely by the drag slider and the cutting slider, the guidance of the insert holder is improved overall. This also contributes to increased productivity.

In an advantageous embodiment of the invention, a straight or cranked insert holder is arranged on the cutting slider or sliders.

By using a cranked insert holder, it is possible to move the cutting edge of the insert arranged on the insert holder so far forward in the axial direction that the cutting edge protrudes beyond the front end of the drill head. It is then possible to gradually enlarge the blind hole or the bottom of the blind hole until a blind hole with a base having the desired shape and the desired diameter has been created.

If the insert holder is exchangeable, straight, i.e. non-cranked, insert holders can also be used for other machining operations and in this way the range of applications of the drill head according to the invention can be expanded.

So that the cranked insert holder can be retracted as far as possible in the radial direction, the projection has, on its end face, at least one recess for the insert holder or holders into which said holder dips when it is fully retracted.

This makes it possible to reduce the effective diameter of the insert holder to such an extent that the cutting edge of the insert holder does not protrude in the radial direction beyond the diameter of the guide hole specified by the guide pads or the damping pads of the drill head. In this position, it is possible to approach the end of the guide hole with the cutting edge of the drill head and then gradually remove material from the end of the blind hole by advancing the insert holder or the drill head.

It has proven to be advantageous if a drag slider and a cutting slider are coupled to one another via driver pins. This type of coupling is very rigid and easy to assemble, and it is possible to separate individual parts, e.g. the drag slider and the cutting slider, if necessary, and to replace a worn cutting slider, for example.

It has proven to be advantageous for a relative movement between the central slider and the body to be converted into a radial advancing movement of the cutting slider or sliders by means of helical teeth. For this purpose, it can be provided that at least one toothed plate is arranged on the central slider and a further toothed plate is arranged in each case on the drag slider or sliders or on the cutting slider or sliders.

In order to remove the chips generated by the drill head according to the invention together with the coolant, at least one opening is provided at a transition between the body and the projection so that the chips and the coolant can enter the interior of the body and are removed from there. This effectively prevents the chips from jamming between the guide pads and the guide hole.

In order to prevent chips from the interior of the body penetrating into the guides or the recesses in the projection of the drill head, a cleaning sleeve is arranged at the transition between the body and the projection. An actuator arranged between the control rod and the central slider is surrounded and guided by the cleaning sleeve. Due to the very small annular gap between the actuator and the cleaning sleeve, no chips can get into the interior of the projection.

In a further advantageous embodiment, at least one pocket for receiving an adapter plate and a toothed plate is provided in the central slider. The adapter plate is arranged between the central slider and the toothed plate and firstly allows the helical teeth to be mounted. Secondly, the backlash between the toothed plates which form the helical teeth can be adjusted using adapter plates of different thicknesses.

In order to prevent chips from penetrating into the interior of the projection, a protection plate and/or a centering plate are provided on one end face. The at least one second recess and the at least one third recess are also covered by protection plates.

The object mentioned at the outset is also achieved by a method according to independent method claim 13. This method includes the following steps:

Retracting the at least one cranked insert holder so that the insert does not protrude in the radial direction beyond a radius or diameter specified by the guide pads and/or the damping pads of the drill head, Approaching the end of the blind hole with the at least one insert; and Advancing the at least one insert with the drill head rotating and moving the drill tube in the feed direction.

In this way it is possible to gradually enlarge the diameter of the base of the blind hole until the desired final diameter is produced.

BRIEF DESCRIPTION OF THE DRAWINGS

In the drawings:

FIGS. 1 to 19 show various representations of an embodiment of a drill head according to the invention and FIGS. 20 to 22 show further views of a drill head according to the invention.

DESCRIPTION OF THE EMBODIMENTS

Figure 1:
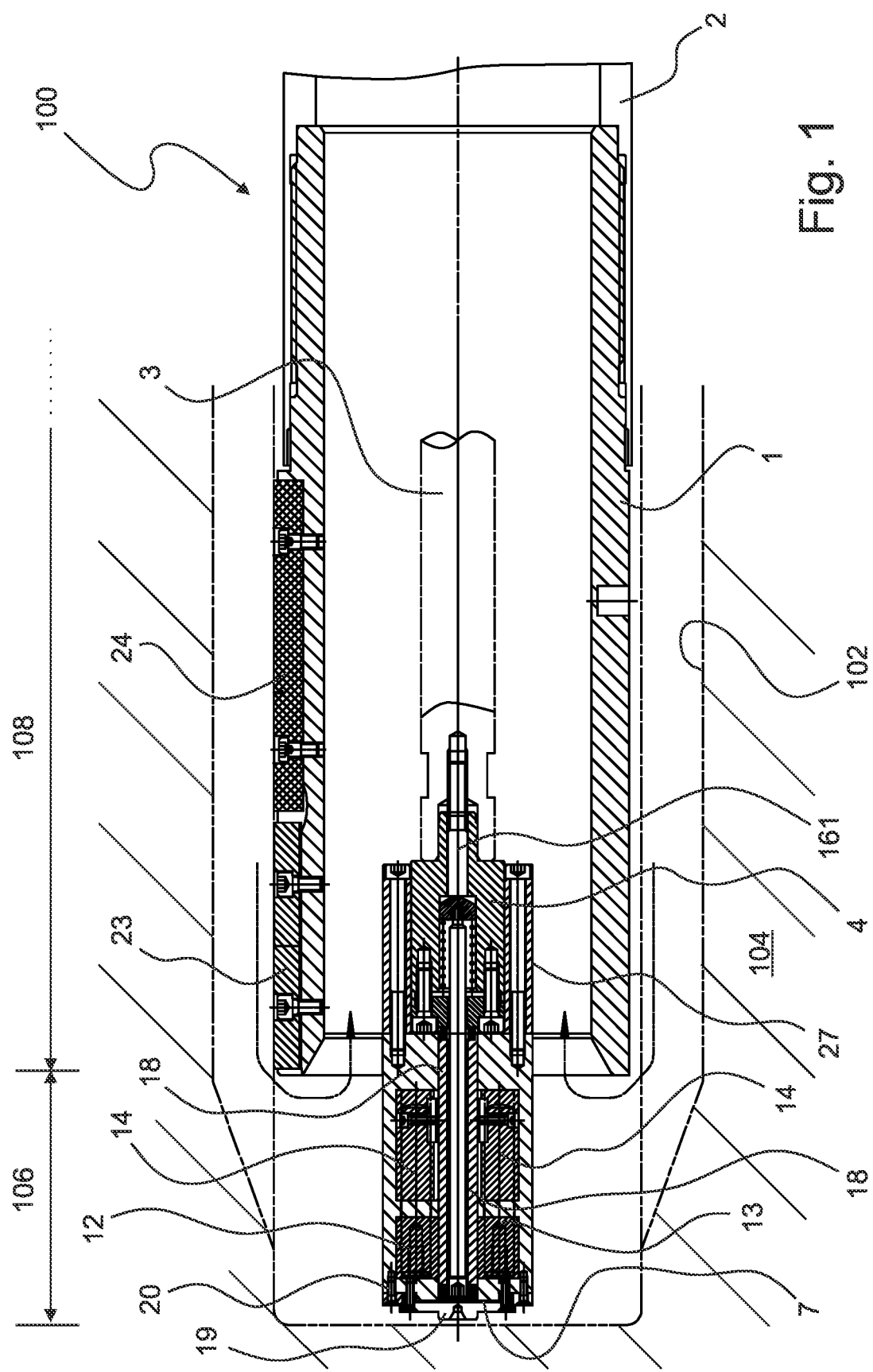

FIG. 1 shows a drill head according to the invention, which has been provided in its entirety with reference sign 100, in longitudinal section. In FIG. 1, the drill head 100 is located in a blind hole 102, which is located in a workpiece 104 indicated by hatching. The blind hole 102 and workpiece 104 are illustrative and do not form part of the invention. A blind hole is a hole with a closed end (on the left in FIG. 1). Sometimes the closed end of the blind hole should be designed as a substantially flat and circular or annular surface, as opposed to a conical or otherwise tapered end (not shown). Such blind holes with a flat end cannot yet be produced with drill heads for chambering according to the current prior art.

With the drill head according to the invention, it has been possible for the first time to use a drill head for chambering to produce blind holes 102 of which the end is a flat, circular surface.

The drill head 100 according to the invention is screwed with its body 1 onto a drill tube 2 or is connected thereto in some other way. The interface between the drill tube 2 and the body 1 is known from the prior art and is therefore not explained in more detail.

The drill head 100 according to the invention can be divided into two regions in the axial direction, namely a front region 106 and a rear region 108. Put simply, the machining takes place in the front region 106, while the guidance and chip removal take place in the rear region 108. The cutting sliders 12, 13, which are not visible in FIG. 1, are actuated via an axial displacement of the control or advancing rod 3, which is connected to an actuator 4. The advancing rod 3 is known from the prior art and is therefore not explained further. The actuator 4 is coupled to a central slider 18, which in turn indirectly brings about the advancing of the cutting sliders 12, 13 and the inserts fastened thereto.

The drill head 100 according to the invention comprises a large number of individual parts. This makes it easier to produce the individual parts and improves the ability of the drill head according to the invention to be assembled. Before explaining the mode of operation of the drill head according to the invention in detail, the most important components of the drill head 100 according to the invention are shown individually and in various views in FIGS. 2 to 19 for better understanding. In order to best disclose the details of the individual parts of the drill head 100 according to the invention, the individual part drawings are shown in different scales.

Figure 2:
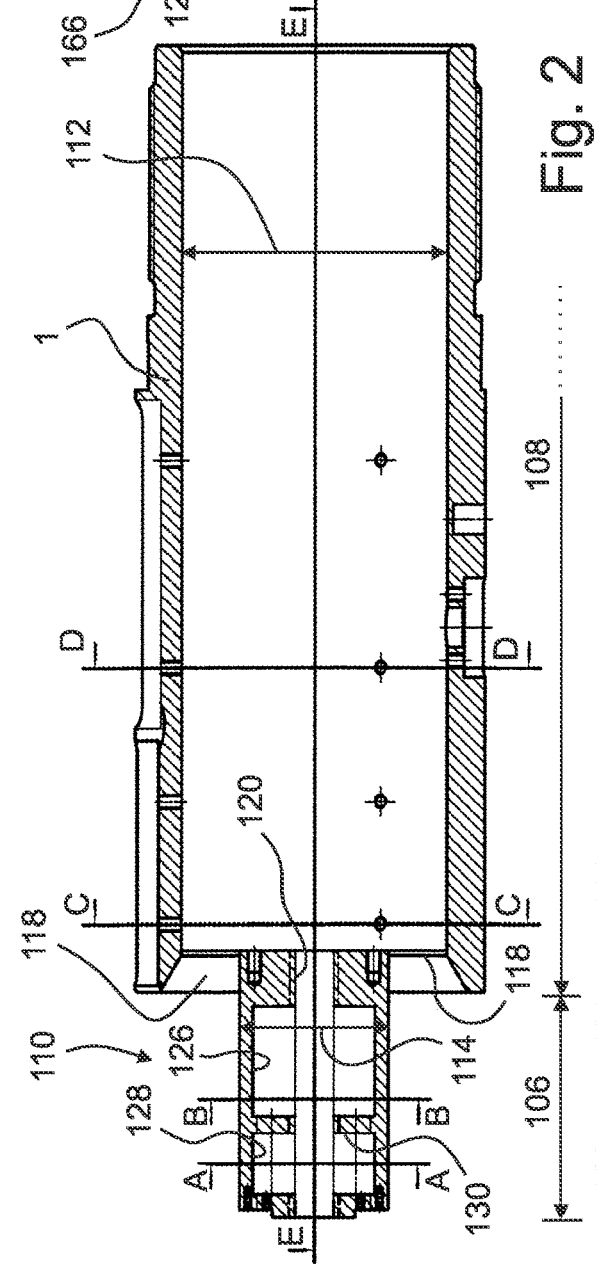

FIG. 2 shows a section of the body 1 in the same view as in FIG. 1, but without fittings and accessories.

Figure 4:
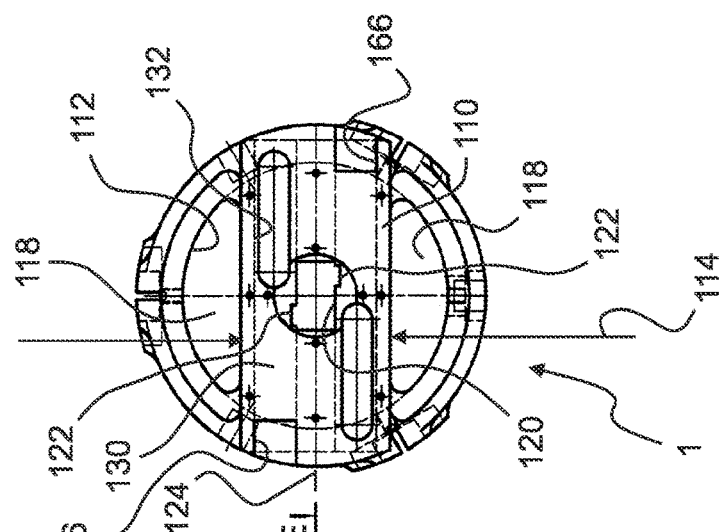
Figure 3:
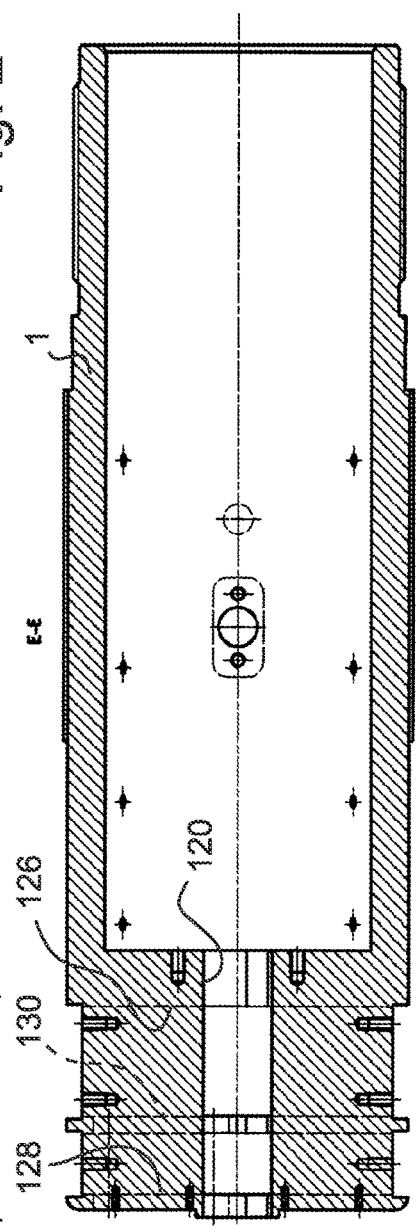

FIG. 3 and FIG. 4 also show the body 1 without attachments. In FIG. 3, the sectional plane through the body 1 is rotated by 90° with respect to FIG. 2 (sectional plane E-E in FIG. 2). FIG. 4 is a front view of the body 1.

Looking at FIGS. 2 to 4 together, it becomes clear that the body 1 has a projection 110 in the front region 106, which projection has a substantially rectangular cross section. The main dimensions of the projection 110 are smaller than an outer diameter of the body 1 in the rear region 108. The body 1 is tubular in the rear region. An inner diameter 112 of the body 1 in the rear region 108 is significantly greater than the height of the rectangular projection 110 (see FIG. 2).

At the transition between the front region 106 and the rear region 108, two openings 118 are formed in the body 1 which are limited on the one hand by the projection 110 and on the other hand by the cylindrical inner diameter 112 of the body 1 in the rear region 108. The openings 118 are relatively large in relation to the chips produced by the inserts of the drill head 100 according to the invention. As a result, the chips generated during the chambering process and the coolant pass from the front region 106 through the openings 118 into the interior of the drill head 100 according to the invention without interference. From there, the further chip removal takes place via the drill tube 2.

Once they have formed, the chips are carried along by the coolant, which is fed from the outside between the hole and the body. Coolant and chips are removed in the interior of the body, which is illustrated by the arrows in FIG. 1. This effectively prevents chips from jamming between the guide and damping pads and the guide hole to be machined.

There are multiple recesses in the projection 110 which are part of different linear guides. A first recess 120 extends coaxially to a central axis of the body 1. It extends over the entire front region. That is, toward the front (on the left in FIGS. 2 and 3), the first recess 120 reaches the front end of the projection 110. The first recess 120 also has a connection to the interior of the body 1 in the rear region 108. As can be seen when looking at FIGS. 2 to 4 together, the cross section of the first recess 120 has the shape of a rectangle, with a groove 122, which also has a rectangular cross section, being made on each of the two long sides of the rectangle (see FIG. 4). The central slider 18 (see FIG. 7) is guided in an axially displaceable manner in the first recess 120. A long toothed plate (see FIG. 8) is received in each of the grooves 122. The details of this guidance are explained below.

As can be seen from FIGS. 2 and 4, the projection 110 is symmetrical with respect to a central plane 124, which is shown in FIG. 4 as a dash-dotted line. This symmetry is created by arranging a first insert holder above the central plane 124 and arranging a second insert holder below the central plane, both of which can be advanced radially outward. The first insert holder and the second insert holder are, however, arranged so as to be offset from one another by 180°, so that the drill head 100 according to the invention is a tool with two cutting edges which are arranged opposite one another. As a result, the radial forces are almost completely eliminated during machining and the chip thicknesses are halved with the same chip volume.

As can be seen from FIG. 2, there is a second recess 126 above the central axis and a third recess 128 parallel thereto. In a corresponding manner, a second recess 126 and a third recess 128 are also arranged below the central axis. For the sake of clarity, these recesses are not provided with reference signs in FIG. 2.

It can be clearly seen in FIG. 3 that the second recesses 126 and the third recesses 128 extend in parallel with one another. It can also be clearly seen that the longitudinal axes of the recesses 126 and 128 extend perpendicularly/orthogonally to the longitudinal or rotational axis of the body 100.

A drag slider 14 (see FIG. 11) is inserted into each of the second recesses 126, while a cutting slider 12, 13 is inserted into each of the third recesses 128. The movements of a drag slider 14, which is guided in the second recess 126, and of the associated cutting slider 12, 13, which is guided in the third recess 128, are coupled to one another. This takes place via pins 30, which each connect a drag slider 14 to a cutting slider 12, 13 (not shown in FIGS. 2 to 4). In order to make this coupling possible, two elongate holes 132 are formed in a strip 130 which delimits the second recesses 126 and the third recesses 128 from one another. These elongate holes 132 can be seen clearly in FIG. 4. Here, too, the centrally symmetrical structure of the drill head 100 in the region of the projection 110 is shown again.

FIG. 5 shows a side view of the body 1 in the same viewing direction as in FIG. 3.

Two depressions 134, 136 can be clearly seen in FIG. 5. Guide pads 23 or damping pads 24 are received in these depressions.

Figure 6:
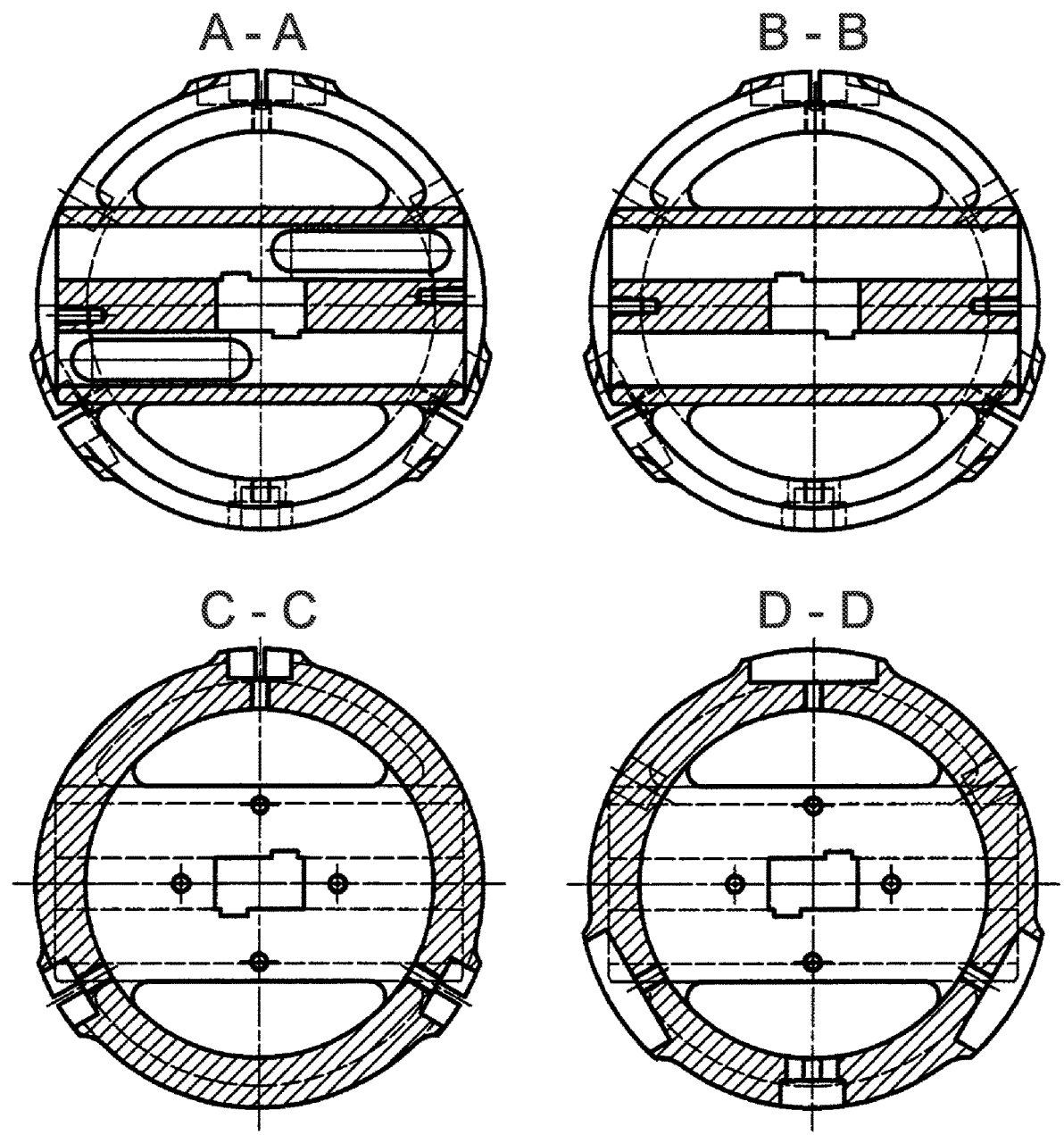

Various sections through the body 1 are shown in FIG. 6. The cutting planes result from FIG. 2. In order not to impair the clarity, not all reference signs are noted in FIGS. 5 and 6.

Figure 7:
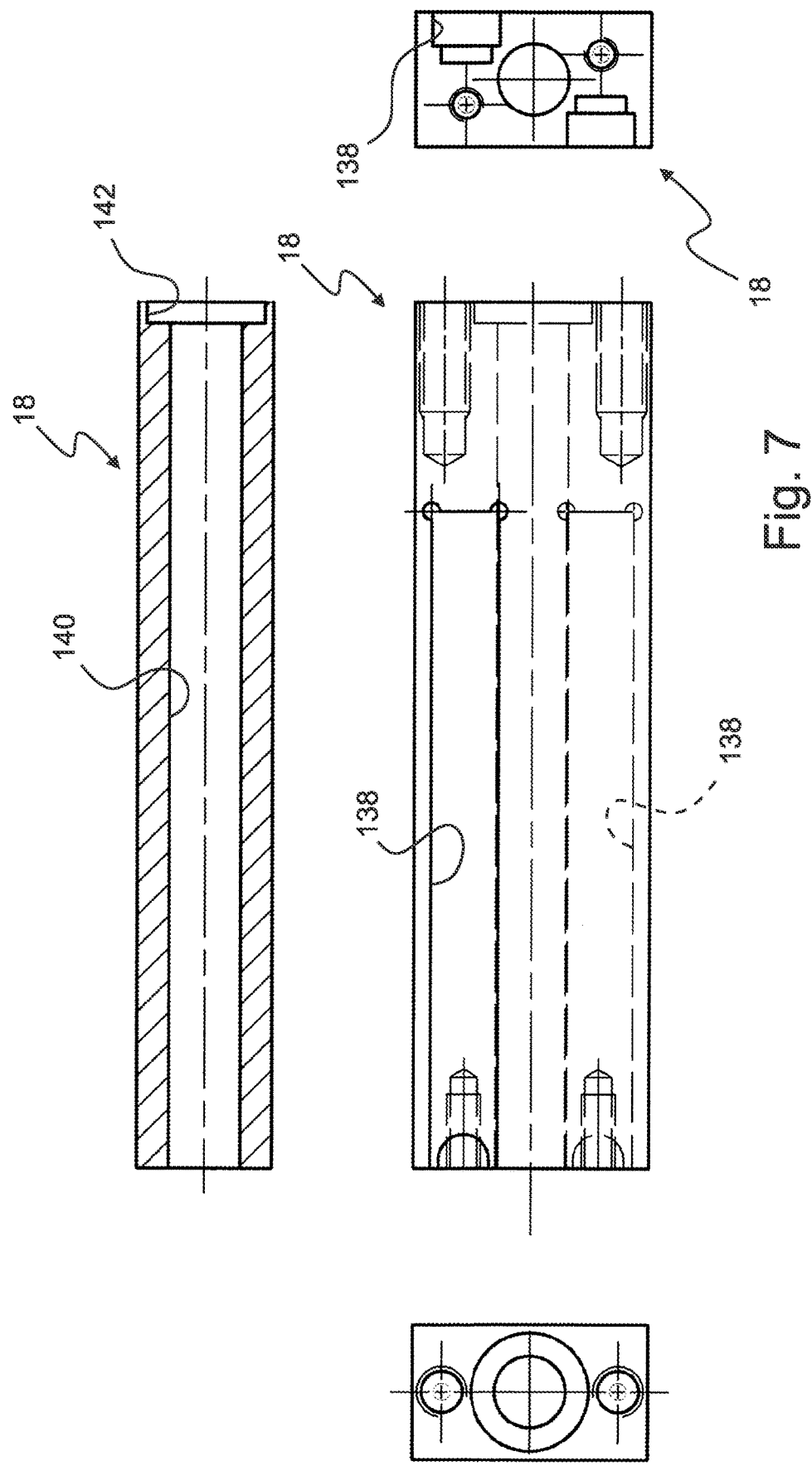

In FIG. 7, the central slider 18 is shown in different views and a longitudinal section. The central slider 18 has a rectangular cross section. A pocket 138 is cut out in each case on an upper side and a lower side of the central slider 18. The pockets 138 are open at one end (on the left in FIG. 7). A long toothed plate (see FIG. 8) is received in each of these pockets 138.

A longitudinal hole 140 with a countersink 142 is formed in the central slider 18. In the region of the countersink 142, the central slider 18 is connected to the actuator 4 (see FIG. 16) via the centering sleeve 26 and the intermediate piece 8. At the opposite end, where the pockets 138 end, there are also two threaded holes (without reference signs). By means of said holes, an end plate 7 (see FIG. 19) is connected to the central slider 18 during the assembly of the drill head 100.

Figure 20:
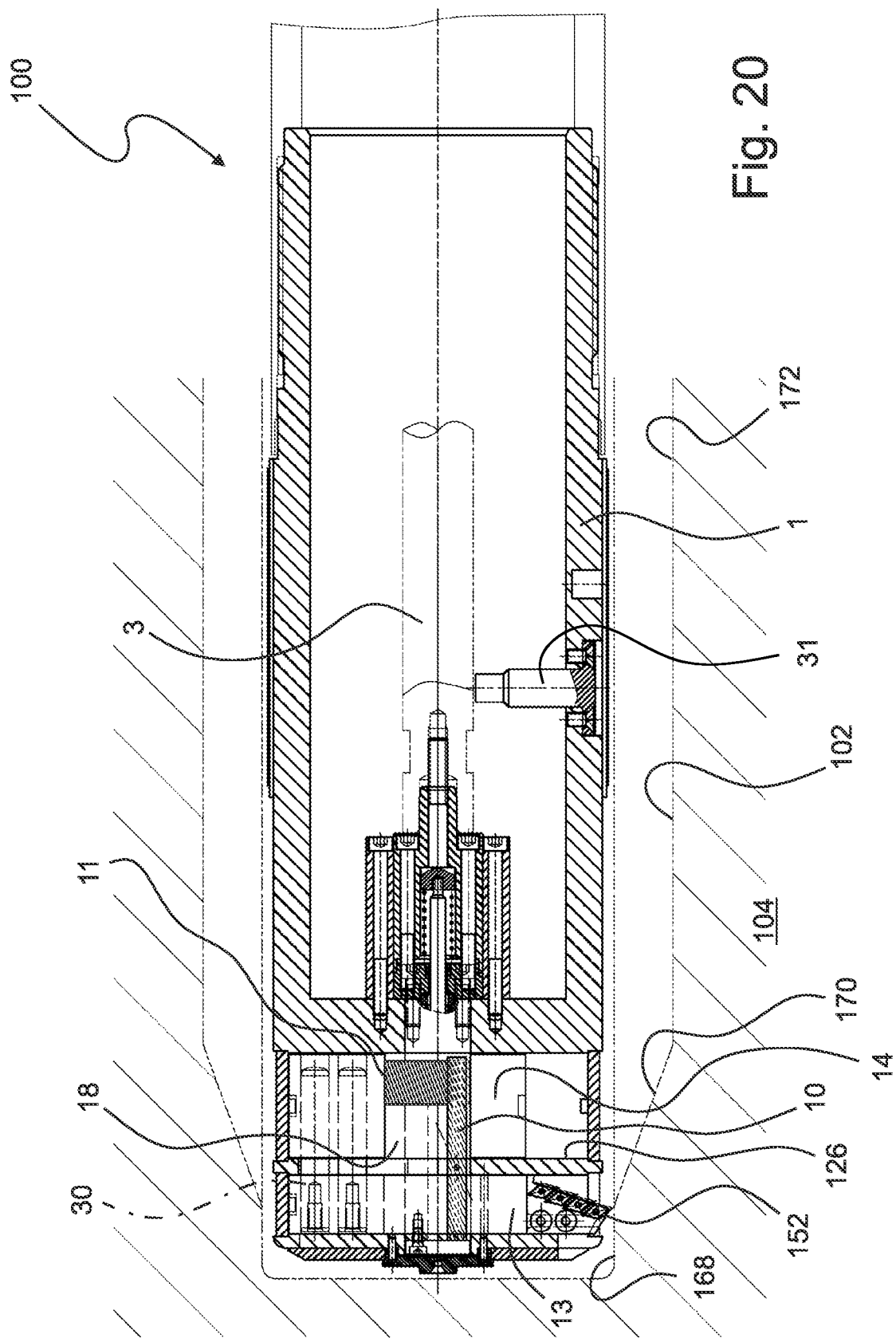
Figure 21:
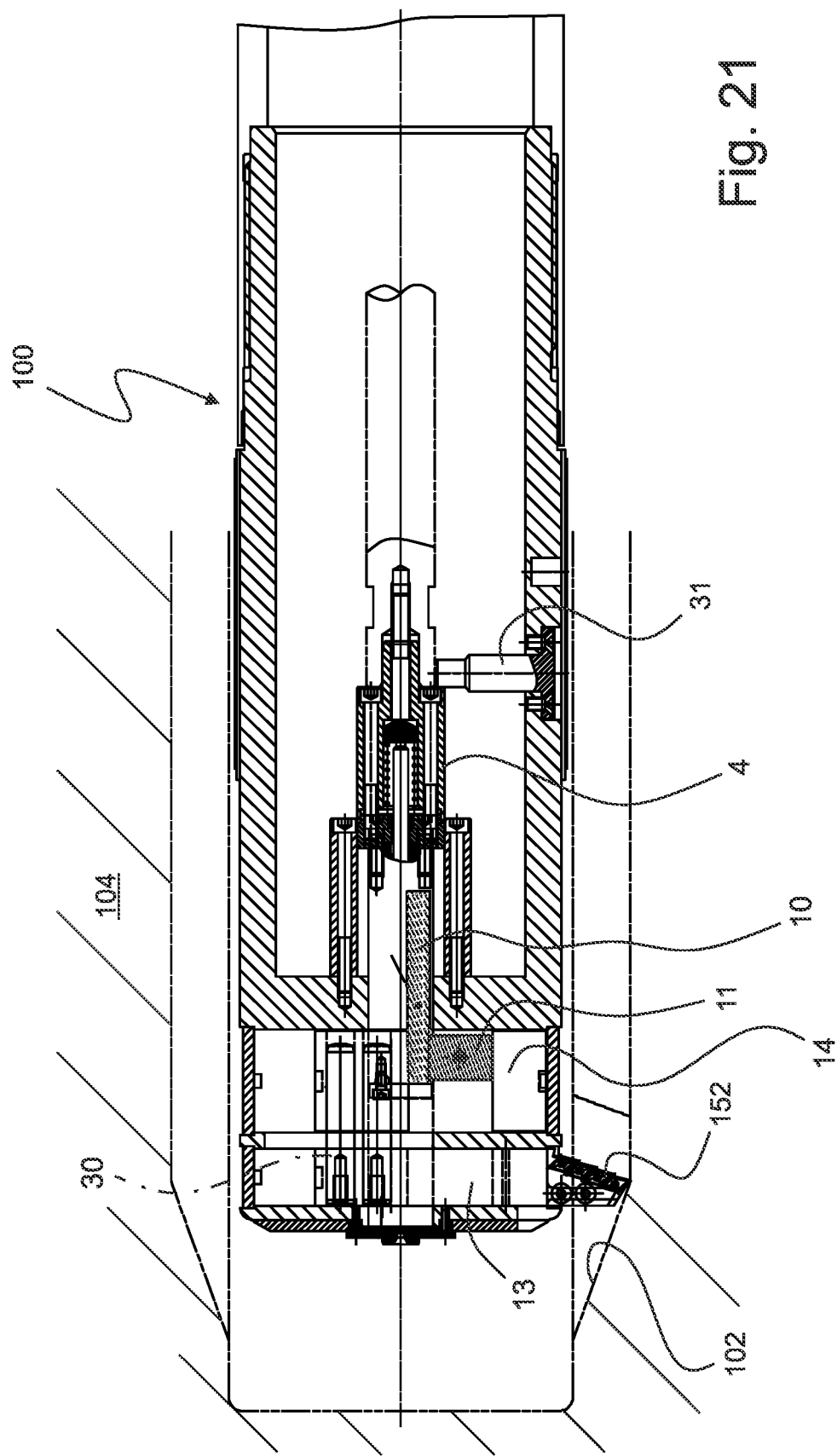
Figure 22:
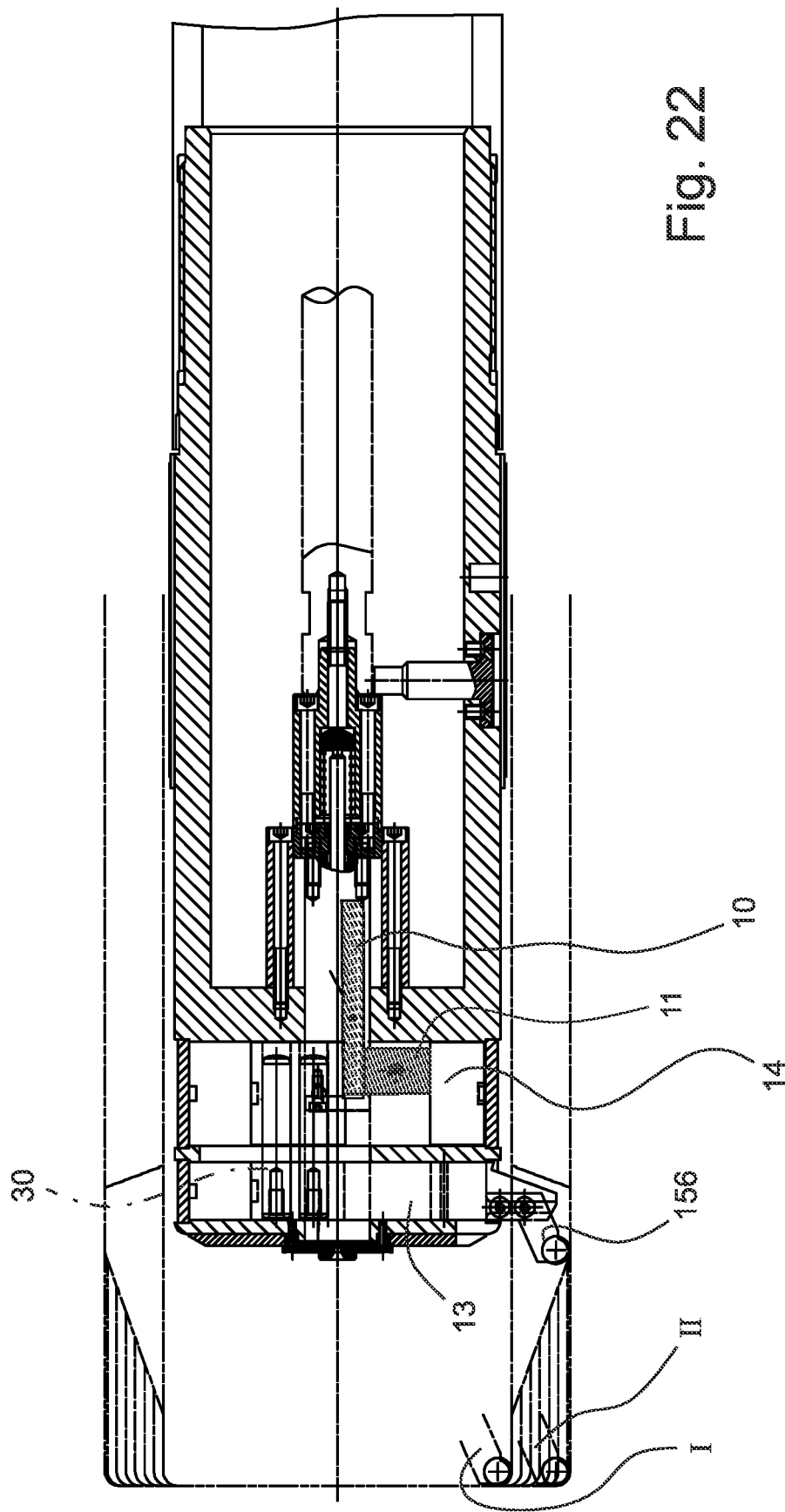

FIG. 8 shows a long toothed plate 10 with helical teeth. In connection with the invention, helical teeth means that the teeth do not extend in parallel with a direction of movement of the toothed plates in the drill head. In FIGS. 20 to 22, the alignment of the teeth is shown by a dash-dotted line without reference signs. The toothed plate 10 also includes an adapter plate 15, as shown in FIG. 9. This adapter plate 15 is inserted into the pocket 138 between the toothed plate 10 and the central slider 18. It facilitates or allows the assembly of the drill head 100 according to the invention, but it is also used to be able to adjust the backlash between helical teeth of the long toothed plate 10 and a transverse toothed plate 11 (see FIG. 10) interacting therewith. In practice, when assembling the drill head, adapter plates 15 of different thicknesses are available and, depending on the tolerance positions of the components to be joined, these tolerances can be compensated for by different thicknesses of the adapter plates 15.

The thickness of the adapter plates 15 is generally greater than the depth of the teeth between the long toothed plate 10 and the transverse toothed plate 11. Thus, when the drill head is to be assembled, it is possible to submerge the long toothed plate without the adapter plate so far into the pocket 138 that it no longer protrudes beyond the upper side of the central slider 18. It is then possible to move the central slider to the desired position. Subsequently, the adapter plate 15 is pushed into the pocket from the end of the central slider and in this way the long toothed plate 10 is "lifted." This results in an engagement between the teeth of the long toothed plate 10 and the transverse toothed plate 11.

Figure 11:
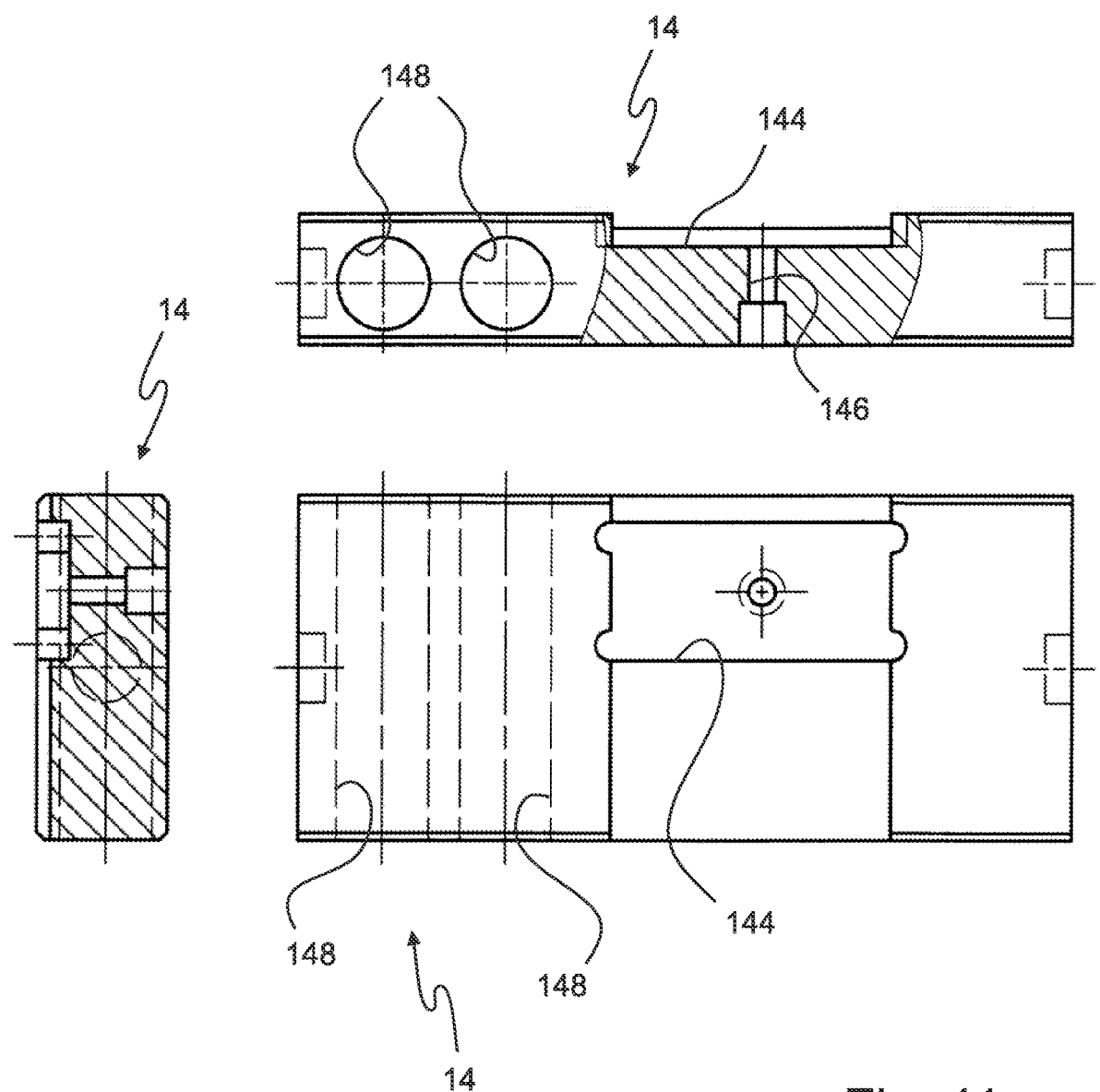

The drag slider 14 is shown in different views in FIG. 11. The drag slider 14 has a rectangular cross section.

A fourth recess 144 is cut out on one side of the drag slider 14. A stepped hole 146 opens into the fourth recess 144. A screw (not shown) is screwed into this stepped hole 146 and secures the toothed plate 11 firmly in the fourth recess 144 via a thread in the transverse toothed plate 11.

As can be seen clearly from the side view and the top view in FIG. 11, the fourth recess 144 and with it the transverse toothed plate 11 are arranged so as to be somewhat offset from the center of the drag slider 14. In the assembled state, the toothed plate 11 or the fourth recess 144 of the drag slider 14 is located in the region of the central axis of the drill head 100. In the assembled state, the drag slider 14 is well guided on both sides of the fourth recess 144 in the first recess 126 (see FIG. 20).

In FIG. 11, two holes 148 are arranged to the left of the third recess 144. The driver pins 30 (not shown) already mentioned above are pressed into the holes 148.

Figure 12:
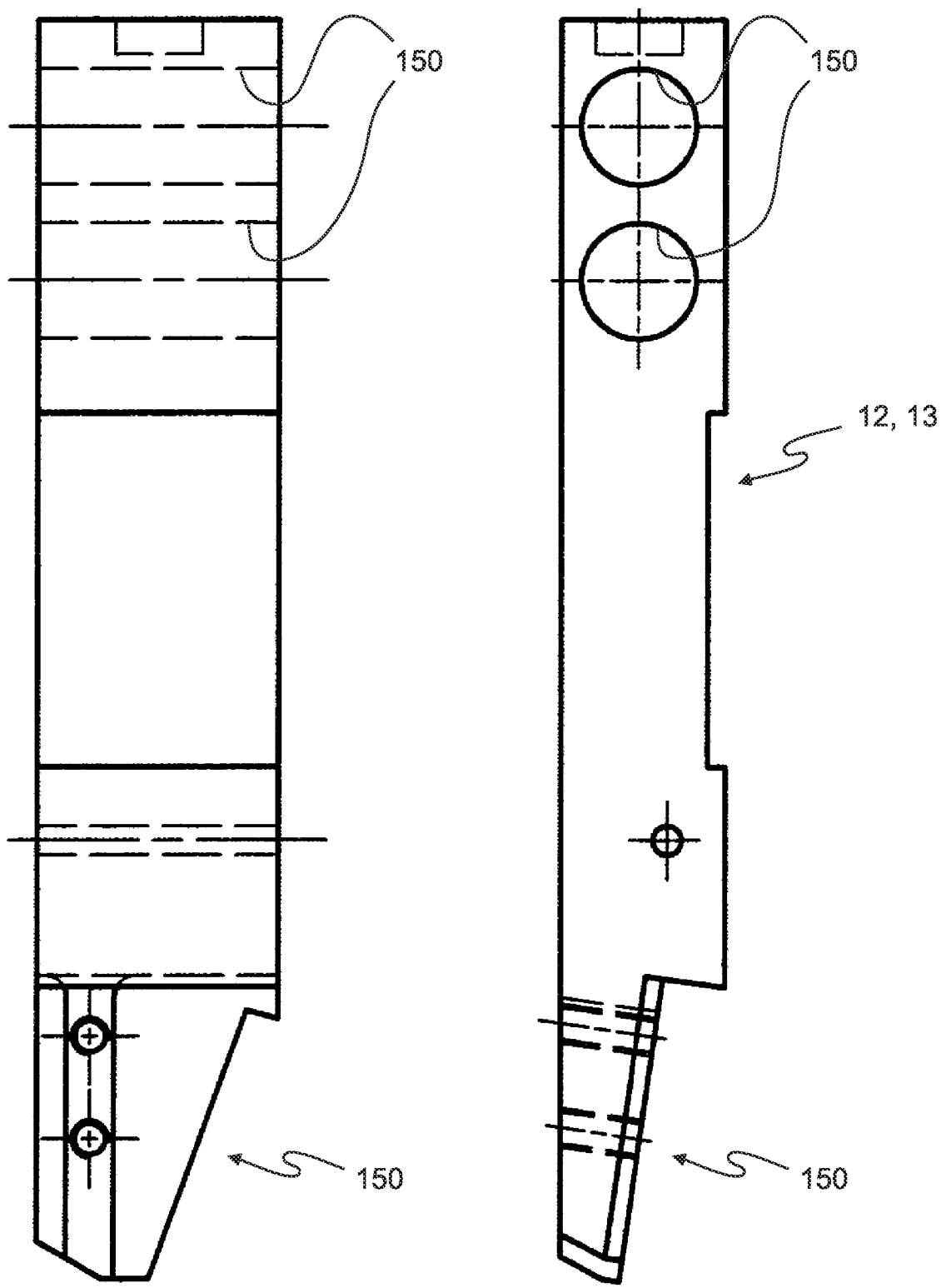

The cutting sliders 12, 13 are shown in two views in FIG. 12. The cutting sliders 12, 13 also have a rectangular cross section. At the upper end in FIG. 12 there are holes 150 which, with regard to their position and their spacing, are arranged in such a way that they correspond to the holes 148 in the drag slider 14. In other words: It is possible to rigidly interconnect a drag slider 14 and a cutting slider 12 or 13 by means of pressed-in driver pins 30.

The cutting sliders 12, 13 are guided in the third recesses 128 in the projection 110. As already explained, a strip 130 is formed between the second recesses 126 and the third recesses 128 in the projection 110. This means that, in the assembled state, the drag slider 14 and the associated cutting slider 12 or 13 are at a certain distance from one another. This distance is bridged by the driver pins 30. The driver pins 30 protrude through the elongate hole 132 in the strip 130 and thereby bridge the distance between the drag slider 14 and the cutting slider 12, 13 caused by the strip 130.

The elongate hole 132 is dimensioned in such a way that a sufficient radial advancement of the cutting slider 12, 13 is possible.

An insert receptacle 150 is formed at the lower end of the cutting sliders 12, 13 in FIG. 12. The insert receptacle has a support surface and two threaded holes (each without a reference sign). The support surface and the threaded holes can be used to fasten various insert holders 16, 17 or 28, as shown in FIGS. 13 to 15, to the cutting sliders 12, 13.

It goes without saying that the invention is not limited to the insert holders 152, 154 and 156 shown by way of example.

Four and three inserts are inserted into the insert holders 152 and 154, respectively. The use of a plurality of relatively small inserts has the advantage that narrow chips are produced.

The insert holder 156 is cranked such that the actual cutting edge 158 protrudes beyond the end of the body 1 or of the projection 110 in the axial direction. This makes it possible to produce the blind hole shown in FIG. 1 with a flat end.

Figure 16:
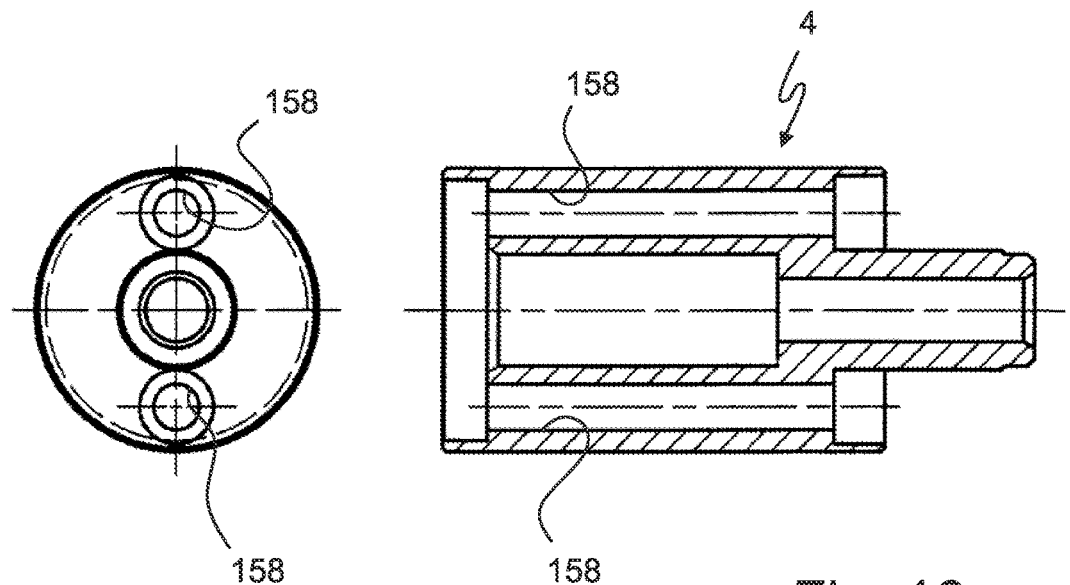
Figure 17:
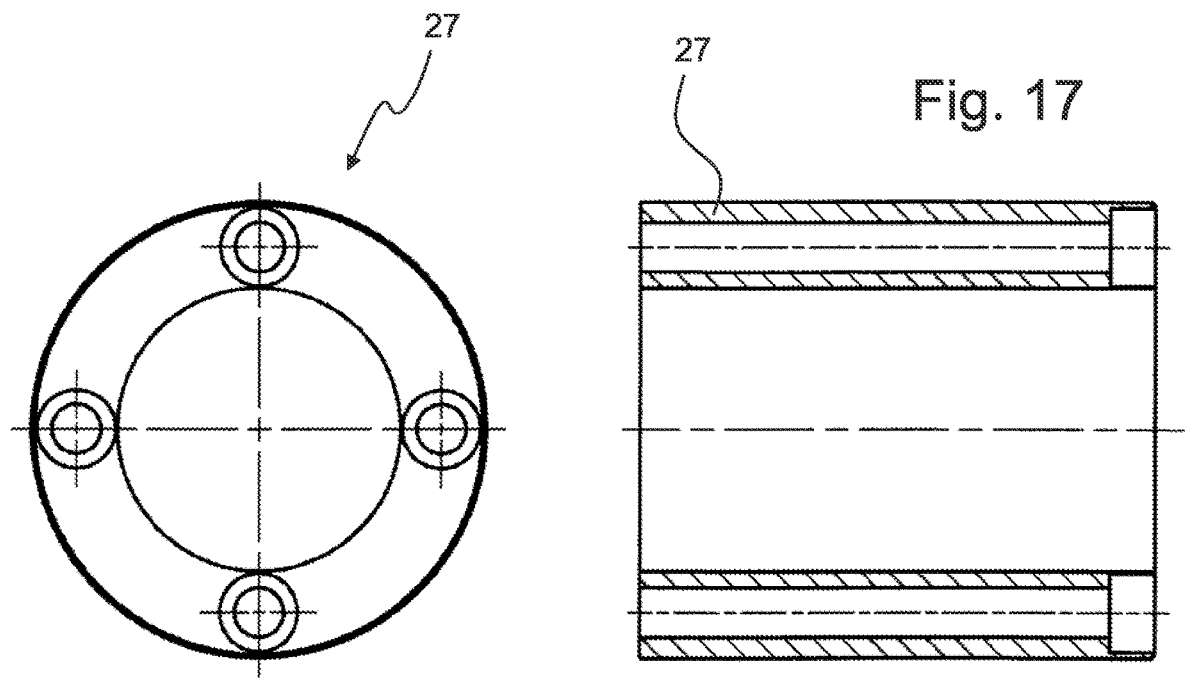

FIG. 16 shows the actuator 4 in a longitudinal section and a front view. It is clear from this that the actuator 4 in this embodiment has a cylindrical outer contour.

The actuator 4 also has two stepped holes 158. Screws are introduced into these stepped holes 158 and screwed into the internal thread of an intermediate piece 8 (see FIG. 18). The intermediate piece 8 is connected to the central slider 18 at the end of the central slider using a fitting sleeve 26 and two screws; in this way, the actuator 4 and the central slider 18 are interconnected. The use of the intermediate piece 8 facilitates the assembly of the drill head (see FIG. 1).

The actuator 4 in turn is guided in a sleeve 27. The sleeve 27 is ultimately a thick-walled tube, the inner diameter of which corresponds to the outer diameter of the actuator 4. This ensures that chips located in the interior of the body 1 cannot get into the interior of the projection 110. The length of the sleeve 27 is greater than the adjustment path of the actuator 4. As can be seen from FIG. 1, the actuator 4 is connected to the control rod 3 via a centrally arranged screw 161. A compression spring (without a reference sign; see FIG. 1) is provided between the screw 161 and the intermediate piece 8 and ensures that the screw 161 is pressed in the direction of the control rod 3.

Figure 18:
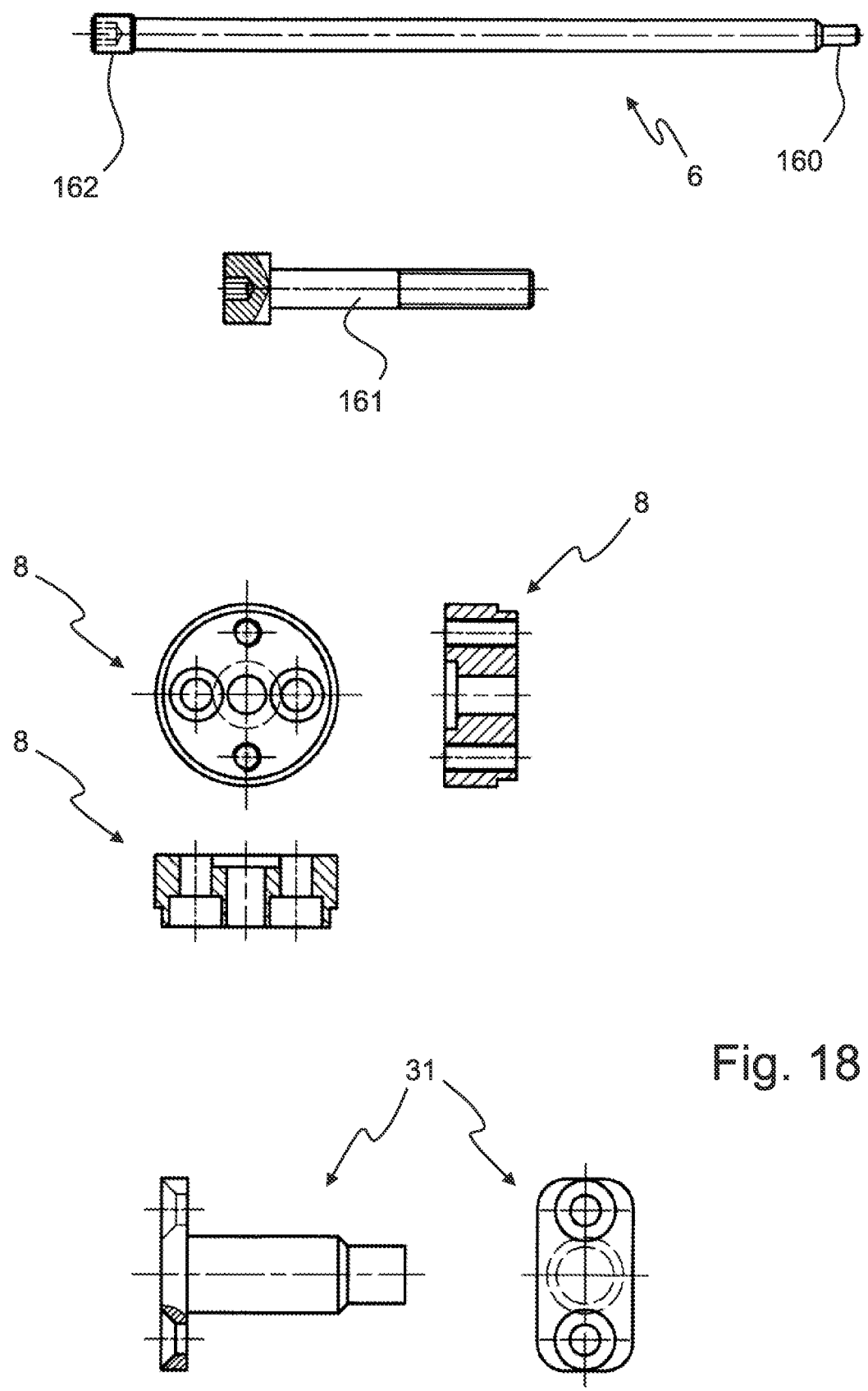

In order to ensure that the screw 161 cannot loosen during operation, a very long threaded pin 6 is provided. This threaded pin 6 is shown in FIG. 18. In FIG. 18, it has a stud 160 which protrudes into the hexagon socket of the screw 161 at its right-hand end, and has a threaded portion 162 at the opposite end. The threaded portion 162 interacts with an internal thread 164 of the end plate 7 (see FIG. 19). The end plate 7 in turn is screwed to the central slider 18. As soon as the end plate 7 is screwed to the central slider 18, the pockets 138 in the central slider 18 are closed at the front end and the long toothed plates 10 are secured against displacement in the axial direction.

At the front end of the drill head 100 according to the invention, said head is closed off by a centering plate 19 and a front protection plate 20, so that no chips can get into the interior of the projection 110. The front protection plate 20 is also shown in FIG. 19. The outer diameter of the centering plate 19 corresponds to the diameter of a central hole in the front protection plate 20. The centering plate 19 has a centering hole for receiving the drill head on a lathe or grinding machine when e.g. the damping pads are reworked.

Recesses 166 are provided in the front protection plate 20. They allow the cutting sliders 12, 13 to be retracted, in particular when the cranked insert holder 156 has been mounted.

Covers 21 and 22 are also shown in FIG. 19. The covers 21 and 22 are used to close the second recesses 126 and the third recesses 128 in the projection 110.

Now that the individual parts of the drill head according to the invention have been explained in detail, its mode of operation will now be described.

Via the control rod 3 or the actuator 4 and the intermediate piece 8, it is possible to move the central slider 18 in the axial direction relative to the body 1 during operation of the drill head. The long toothed plates 10 attached to the central slider 18 mesh with the transverse toothed plates 11 of the two drag sliders 14 guided in the second recesses 126. Due to the helical teeth formed by one long toothed plate 10 and one transverse toothed plate 11, any movement of the central slider 18 in the first recess 120 causes the two drag sliders 14 to move radially outward or inward. Via the driver pins 30, one cutting slider 12, 13 each is coupled to one drag slider 14 each, so that the relative movements of the control rod 3 are converted into corresponding advancing movements of the cutting sliders 12, 13.

This allows a radial advancement of the cutting sliders 12, 13 and the insert holders 152, 154 and 156 fastened thereto during operation of the drill head 100 so that desired contours in the workpiece 104 can be chambered.

The mode of operation can be understood by comparing FIGS. 20 and 21.

FIGS. 20 and 21 show the drill head 100 with the insert holder 152 mounted. In FIG. 20, the insert holder 152 is fully retracted. That is to say, the outermost tip of the insert holder 152 or the insert 29 arranged thereon does not protrude in the radial direction beyond the diameter of the body 1 or the guide pads 23 and the damping pads 24.

In order to approach this minimum diameter, the control rod 3 is moved all the way to the left in FIG. 20, i.e. in the direction of the projection 110. As a result, the central slider 18 almost touches the front protection plate 20. The long toothed plate 10 and the transverse toothed plate 11 are also shown in FIG. 20. Due to this position of the central slider 18, the visible drag slider 14 in FIG. 20 has moved all the way up. The coupling of the drag slider 14 and the cutting slider 13 or 12 via the driver pins 30 has the effect that the cutting slider 13 is fully retracted, as shown in FIG. 20. The cutting slider 12 is not visible in FIG. 20 ff.; the same applies to it. In this position, the cutting edge of the insert holder or holders has the smallest possible distance from the axis of rotation of the drill head.

FIG. 21 then shows the other extreme situation, in which the cutting slider 12 is fully extended so that the drill head 100 according to the invention has the largest possible machining diameter. This is achieved in that the central slider 18 has been moved so far to the right by the control rod 3 in FIG. 21 relative to the body 1 that the actuator 4 rests against the end stop 31.

Due to the helical teeth on the long toothed plate 10 and the transverse toothed plate 11, the drag slider 14 in FIG. 21 has moved downward and as a result the cutting slider 12 coupled to the drag slider 14 is fully extended.

All intermediate positions between these two extreme positions are possible, so that almost any complex non-cylindrical inner contours can be produced with the drill head 100 according to the invention by means of a controlled superimposition of the feed movement and the advancing movement.

FIGS. 20 and 21 show the contour of the hole 102 which can be produced with the insert holder 152 or 154 (see FIGS. 13 and 14). At the end of the hole 102 there is a cylindrical portion 168 which corresponds to the diameter of the guide hole that was made in the workpiece 104 for guiding the drill head 100 via the guide pads 23 and the damping pads 24. A frustoconical portion 170 then begins, which merges into a cylindrical portion 172. The frustoconical portion 170 and the enlarged diameter in the region 172 can be produced with the aid of the drill head 100 according to the invention using the insert holders 152 or 154. However, it is not possible to reach the end of the hole with the insert holders 152 or 154.

For example, if the end face of the blind hole is to be chambered so that it has the same diameter as the portion 172, the cranked insert holder 156 (see FIG. 15) is used, as shown in FIG. 22. First, only the frustoconical portion 170 is produced using the insert holders 152 and 154, so that there is still enough guide length remaining. The cranking of the insert holder 156 is dimensioned such that the insert of the insert holder protrudes in the axial direction beyond the (front) end of the projection 110, in particular also beyond the centering plate 19 and the front protection plate 20. In order to bring the hole in the region of the portion 168 to the diameter of the hole portion 172, the cutting slider 156 is first fully retracted so that the insert holder 156 and the insert fastened thereto do not protrude in the radial direction beyond the guide pad 23 and the damping pad 24. In this state it is possible to move the insert holder or the entire drill head so far to the left in the blind hole that the insert holder or the cutting edge rests against the bottom of the blind hole. This position of the insert holder 156 is indicated by I in FIG. 22. For the sake of clarity, the associated drill head 100 is not shown. In this position, the drill head 100 is now rotated and an advancement of for example 1.5 mm or 3 mm takes place so that the cutting edge penetrates into the cylindrical portion 168 of the guide hole. The rotating drill head 100 then moves relative to the workpiece (to the right in FIG. 22) and a part of the cylindrical portion 168 is removed. As soon as the insert has reached the frustoconical portion 170, the feed movement is ended. The drill head moves again (to the left in FIG. 22) to the end of the blind hole. There, the insert holder or the insert is advanced again and the drill head 100 is moved out of the cylindrical portion 168 to the right in FIG. 22. This process can be repeated until the insert holder 156 or the insert fastened thereto has reached the diameter of the cylindrical portion 172. This position of the insert holder 156 is denoted by reference sign II in FIG. 22. The various advancing movements and feed movements in between are indicated by multiple parallel lines (without reference signs). Finally, the bottom of the blind hole can also be leveled with a small finishing cut. The feed movement must be completed before the cutting edge 156 hits the step created by the preliminary work (production of the frustoconical portion 170).

At the end, the blind hole 102 is cylindrical with a diameter corresponding to the cylindrical portion 172 down to the bottom of the blind hole. This is a contour of the blind hole that could not be realized with conventional drill heads.

Keeping in mind that, as indicated by reference sign I, the cranked insert holder 156 must be retracted very far in order to be able to enter the cylindrical portion 168, the function of the recesses 166 in the front protection plate 20 (see FIG. 19) becomes clear. The recesses are used to accommodate the cranked part of the insert holder 156 or to allow its advancing movement radially inward.

When the straight bottom is made, the insert holder 156 is retracted and the drill head is extended out of the guide hole. The insert holders 152 and 154 are mounted. The rotating drill head is retracted up to the contour that has just been produced. The inserts are extended and can now produce the rest of the contour without stopping.

What is claimed is:

1. Drill head comprising a body with a rear end and a front end, the body having, at the rear end, a mechanical interface for connection to a drill tube and, at the front end, a projection extending in the axial direction and having a first recess, with a central slider which can be displaced in the axial direction being guided in the first recess, with at least one third recess extending in the radial direction being formed in the projection, with a cutting slider being guided in every third recess, the central slider and the at least one cutting slider being coupled to one another in such a way that a relative movement between the central slider and the body causes a radial advancing movement of the cutting slider or sliders, characterized in that at least one second recess extending in the radial direction and in parallel with the at least one third recess is formed in the projection, in that a drag slider is guided in the second recess or recesses in each case, and in that in each case a cutting slider and a drag slider are coupled to one another in such a way that advancing movements of the drag slider are transmitted to the cutting slider-coupled thereto.

2. Drill head according to claim 1, characterized in that an insert holder is arranged on the cutting slider or sliders, wherein the insert holder is straight or wherein the insert holder is cranked and has a cutting edge which protrudes beyond the front end of the body or of the projection in the axial direction.

3. Drill head according to claim 2, characterized in that the projection has, on its end face, at least one recess for the insert holder.

4. Drill head according to claim 2, characterized in that the cutting slider and the insert holder are designed in one piece or as separate components.

5. Drill head according to claim 1, characterized in that a cutting slider and a drag slider are interconnected by one or more driver pins.

6. Drill head according to claim 1, characterized in that a relative movement between the central slider and the body is converted into a radial advancing movement of the cutting slider or sliders by means of helical teeth.

7. Drill head according to claim 6, characterized in that at least one toothed plate is arranged on the central slider and a further toothed plate is arranged on each of the drag slider or sliders.

8. Drill head according to claim 1, characterized in that at least one opening is provided at the transition between the body and the projection.

9. Drill head according to claim 1, characterized in that a cleaning sleeve is provided at the transition between the body and the projection, and in that an actuator arranged between the control rod and the central slider is surrounded by the cleaning sleeve.

10. Drill head according to claim 1, characterized in that at least one pocket for receiving a toothed plate and an adapter plate is provided in the central slider.

11. Drill head according to claim 1, characterized in that the projection has, on its end face, a front protection plate and a centering plate.

12. Drill head according to claim 1, characterized in that the at least one second recess and the at least one third recess are covered by protection plates.

13. Method for producing a blind hole with a flat bottom using a drill head according to claim 1, the drill head having at least one insert holder, the insert holder being cranked and having a cutting edge which protrudes beyond the front end of the body or of the projection in the axial direction, the method comprising the following steps:

retracting the at least one cranked insert holder into a hole in a workpiece so that the insert does not protrude in the radial direction beyond a radius or diameter specified by the guide pads and/or the damping pads of the drill head, approaching the end of the blind hole with the at least one cutting insert, advancing the at least one insert with the drill head and/or the workpiece rotating, and moving the drill tube in the feed direction.

14. Method according to claim 13, characterized in that the method steps are repeated multiple times so that the flat surface at the end of the blind hole becomes larger and larger.

\* \* \* \* \*